(12) United States Patent
Gryskiewicz

(10) Patent No.: US 6,573,946 B1
(45) Date of Patent: Jun. 3, 2003

(54) SYNCHRONIZING VIDEO STREAMS WITH DIFFERENT PIXEL CLOCK RATES

(75) Inventor: Paul S. Gryskiewicz, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 09/652,696

(22) Filed: Aug. 31, 2000

(51) Int. Cl.[7] .................................................. H04N 9/76
(52) U.S. Cl. ........................ 348/600; 348/589; 345/629
(58) Field of Search ................................. 348/584, 589, 348/598, 600, 441, 500, 510, 714, 718; 345/629, 634, 631, 638, 660, 531, 667, 682, 560, 718

(56) References Cited

U.S. PATENT DOCUMENTS

| | | | | |
|---|---|---|---|---|
| 4,994,912 A | * | 2/1991 | Lumelsky et al. | 358/140 |
| 5,355,175 A | * | 10/1994 | Okada et al. | 348/595 |
| 5,402,147 A | * | 3/1995 | Chen et al. | 345/115 |
| 5,594,467 A | * | 1/1997 | Marlton et al. | 345/115 |
| 5,598,525 A | * | 1/1997 | Nally et al. | 395/520 |
| 5,923,322 A | * | 7/1999 | Kim | 345/204 |
| 6,172,669 B1 | * | 1/2001 | Murphy et al. | 345/199 |
| 6,380,945 B1 | * | 4/2002 | MacInnis et al. | 348/602 |

OTHER PUBLICATIONS

Dr. J. Kramer, *Getting in Sync*, Jul. 14, 1999, 6 Pages.

* cited by examiner

Primary Examiner—Victor R. Kostak
(74) Attorney, Agent, or Firm—Trop, Pruner & Hu, P.C.

(57) ABSTRACT

Two independent visually displayable data streams may be synchronized in real-time. One data stream may be converted to look like the other data stream prior to mixing the two data streams together. One data stream is buffered while the other data stream is converted. A memory buffer is used to synchronize the two data streams.

19 Claims, 6 Drawing Sheets

SYNCHRONIZING VIDEO STREAMS WITH DIFFERENT PIXEL CLOCK RATES

BACKGROUND

This application relates generally to video signals and, more particularly, to combining video signals.

The popularity of television has generated a diverse array of programming in recent times. Viewers increasingly may access hundreds of channels devoted to a variety of subjects, resulting a highly competitive marketplace.

Programming increasingly may include value-added features, ostensibly to distinguish a channel from competing channels. Viewers may receive stock data simultaneously with a news program, for example. Many channels feature an identification logo which remain affixed on the display during the featured program. Sometimes a program is scaled down to occupy only a portion of the screen while emergency weather information, for example, is presented to the display.

Manufacturers of television displays, too, are offering value-added features which change the way programming is viewed. Picture-in-picture is a popular option which allows two programming channels to be viewed simultaneously. Programming guides are also available on many television sets.

Many of these value-added features involve personal computer (PC) graphics. PC graphics, typically created on a processor-based system, may be combined with a television signal prior to viewing on a television display. Alternatively, PC graphics data may be sent to a computer monitor for display.

The video signal that includes television programming is different from a PC graphics signal. In fact, graphics images are often created to be displayed on a computer monitor rather than on a television screen.

Computer monitors operate differently than television displays. While computer monitors may receive video data intended for a television, typically the video data is first converted prior to being sent to the computer monitor. Likewise, PC graphics data is typically converted prior to being transmitted to a television screen.

Mixing video and graphics signals together, likewise, typically requires one or both signals to be adjusted in some way. Color space conversion, progressive to interlaced conversion, and adjustment of data transmission rate, to name a few examples, may be performed on one or both signals prior to combining them.

A video and a graphics signal may be combined by buffering one signal, typically the signal moving at a faster rate, in a frame buffer memory. When a frame of graphics data is stored, for example, the frame buffer may be emptied at a slower clock rate, e.g., the rate of the slower video data. Once the faster data is slowed down the two signals may be combined.

However, frame buffer memory is expensive. A single frame of graphics data with an 800×600 resolution, at two bytes per pixel, fills a one megabyte frame buffer. Further, for real-time processing, the delay associated with filling the frame buffer may be undesirable.

Thus, there is a continuing need to combine video signals running at different clock rates in real time without excessive use of frame buffer memory.

Detailed Description

In the following description, numerous details are set forth to provide an understanding of the present invention. However, it will be understood by those skilled in the art that the present invention may be practiced without these details and that numerous variations or modifications from the described embodiments may be possible. Although reference is made to particular data rates and resolutions for both the graphics and the video signals described herein, further embodiments may include video signals with different data rates or pixel resolutions and the specific examples described are meant in no way to limit the scope of the invention.

In accordance with the embodiments described herein, two video streams having different pixel clock rates are synchronized such that they may be combined before being sent to a display. In one embodiment, graphics data from a graphics stream and video data from a video stream may be synchronized, then combined, before being viewed simultaneously. The two data signals are received at different pixel clock rates, but are synchronized before being combined.

Figure 1:
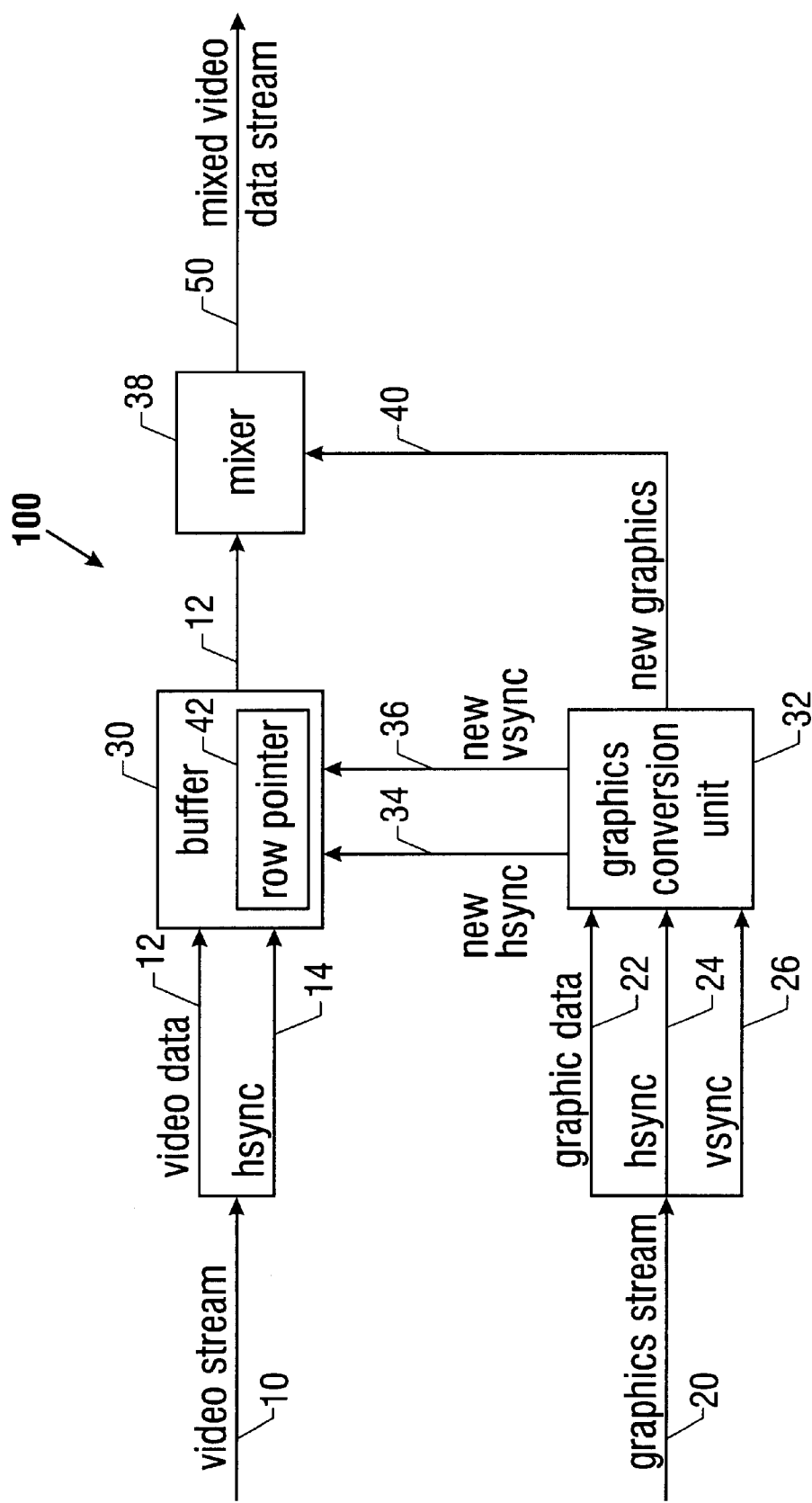
FIG. 1 is a block diagram of a system according to one embodiment of the invention.

In FIG. 1, a system 100 receives a video stream 10 and a graphics stream 20, according to one embodiment of the invention. The video stream 10 may be a digitized analog or a digital video signal, and may be converted from one of a variety of types of analog signals commonly known in the art, such as a composite video signal, an S-video signal, or a component video signal, to name a few examples.

The graphics stream 20 may likewise be identified as one of several possible types of graphics data. As used herein, the graphics stream 20 describes video data generated by a software program running on a processor-based system.

Whether graphics-based or not, video signals that are to be displayed on a monitor carry synchronization information. The synchronization information is used to identify where in the stream the actual video data may be found. Likewise, the synchronization information helps to properly align the image generated from the data and displayed on the monitor. As the video stream 10 and the graphics stream 20 are to be displayed, both streams 10 and 20 thus include synchronization information.

Accordingly, in FIG. 1, the video stream 10 comprises a video signal 12, or video data 12, which constitutes the data that makes up the image, and a horizontal synchronization, or horizontal sync, signal 14. The horizontal sync signal 14, also known as a line sync signal, indicates the location of a portion of video data 12, such as a line or row, in the video stream 10.

The video stream 10 also includes a vertical sync signal (not shown). However, according to one embodiment, the system 100 synchronizes the graphics stream 20 with the video stream 10 such that a single vertical sync signal 26 may be used to process both data streams 10 and 20. In this manner, both the video stream 10 and the graphics stream 20 may be processed contemporaneously, using the single vertical sync signal 26.

In one embodiment, the video stream 10 is received in the digitized form according to a well-known video standard, such as the interlaced composite color television standard of the National Television Systems Committee (NTSC). For example, an interlaced color composite signal includes 525 lines, is interlaced 2:1, and has a 59.95 Hz field rate (NTSC, 1953).

The graphics stream 20, in contrast, is generated by software running on a processor-based system 200 (see FIG. 6, below), according to one embodiment. The graphics stream 20 is thus typically under the control of the processor-based system 200 while the video stream 10 may not be. Thus, in one embodiment, the vertical sync signal 26 of the graphics stream 10 is defined to be coincident with the vertical sync signal (not shown) of the incoming video stream 10.

The graphics stream 20 is comprised of a graphics signal 22, or graphics data 22, a horizontal sync signal 24, and a vertical sync signal 26. The vertical sync signal is sometimes called a field sync signal. Depending upon the type of data signal being synchronized, the vertical sync signal 26 may indicate the beginning of a new frame or a new field. For example, in one embodiment, the vertical sync signal 26 indicates the start of a new field for interlaced signals and the start of a new frame for progressive signals.

Figure 2A:
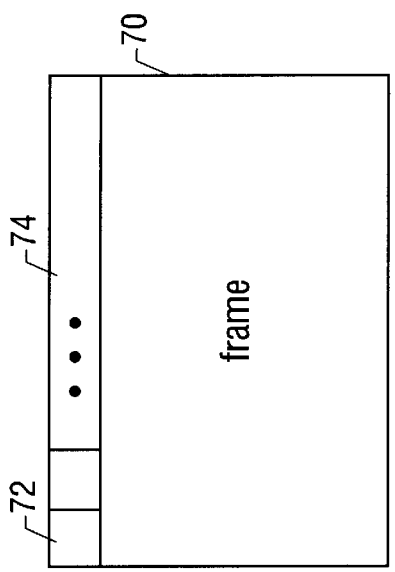
FIG. 2A is a block diagram of a frame according to one embodiment of the invention.

In FIG. 2A, according to one embodiment, a frame 70 of video data is comprised of a plurality of pixels 72. The pixels 72, or "picture elements," comprise the smallest unit of the frame 70. Each pixel 72 may be defined using one or more bytes of data. These bytes are part of the video data portion 12 and the graphics data portion 22 of the video stream 10 and graphics stream 20, respectively.

The pixels 72 arranged horizontally across the frame 70 and one pixel deep are known as a row 74 of pixels 72. The number of pixels 72 in the frame 70, e.g., its resolution, is typically represented as the number horizontal pixels 72 "times" the number of vertical pixels 72. A frame 70 may have a resolution of 720×480, 800×600, 1024×768, and so on.

Additionally, a data rate is associated with each stream 10 or 20, and is typically expressed in frames per second, known as the frame rate. In one embodiment, the video stream 10 and the graphics stream 20 have the same frame rate, 60 frames/second. Accordingly, for each stream 10 and 20, a single frame 70 is transmitted in $\frac{1}{60}^{th}$ of a second.

Figure 2B:
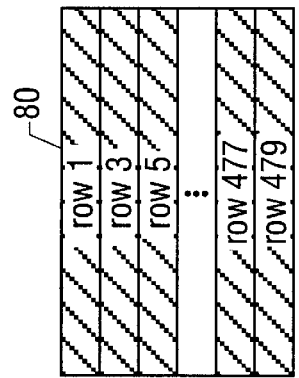
FIG. 2B is a block diagram a field according to one embodiment of the invention.
Figure 2B:
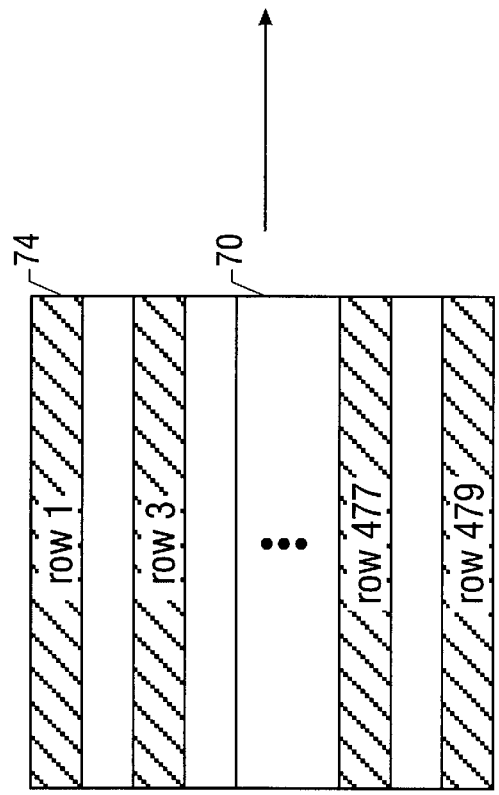

In addition to the frame rate, signals which are interlaced are further described in terms of a field 80, as shown in FIG. 2B. A field is one-half of a frame. For interlaced signals, typically analog or digital video, the field 80 of video data may include all of the odd rows 74 of the frame 70 or all of the even rows 74 of the frame 70. Thus, a field rate of 60 fields/second corresponds to a 30 frames/second frame rate, which is typical for interlaced video signals. In FIG. 2B, the frame 70 has a resolution of 720×480. The odd rows 74 are shaded. The field 80 is made up of only odd rows 74.

Figure 3:
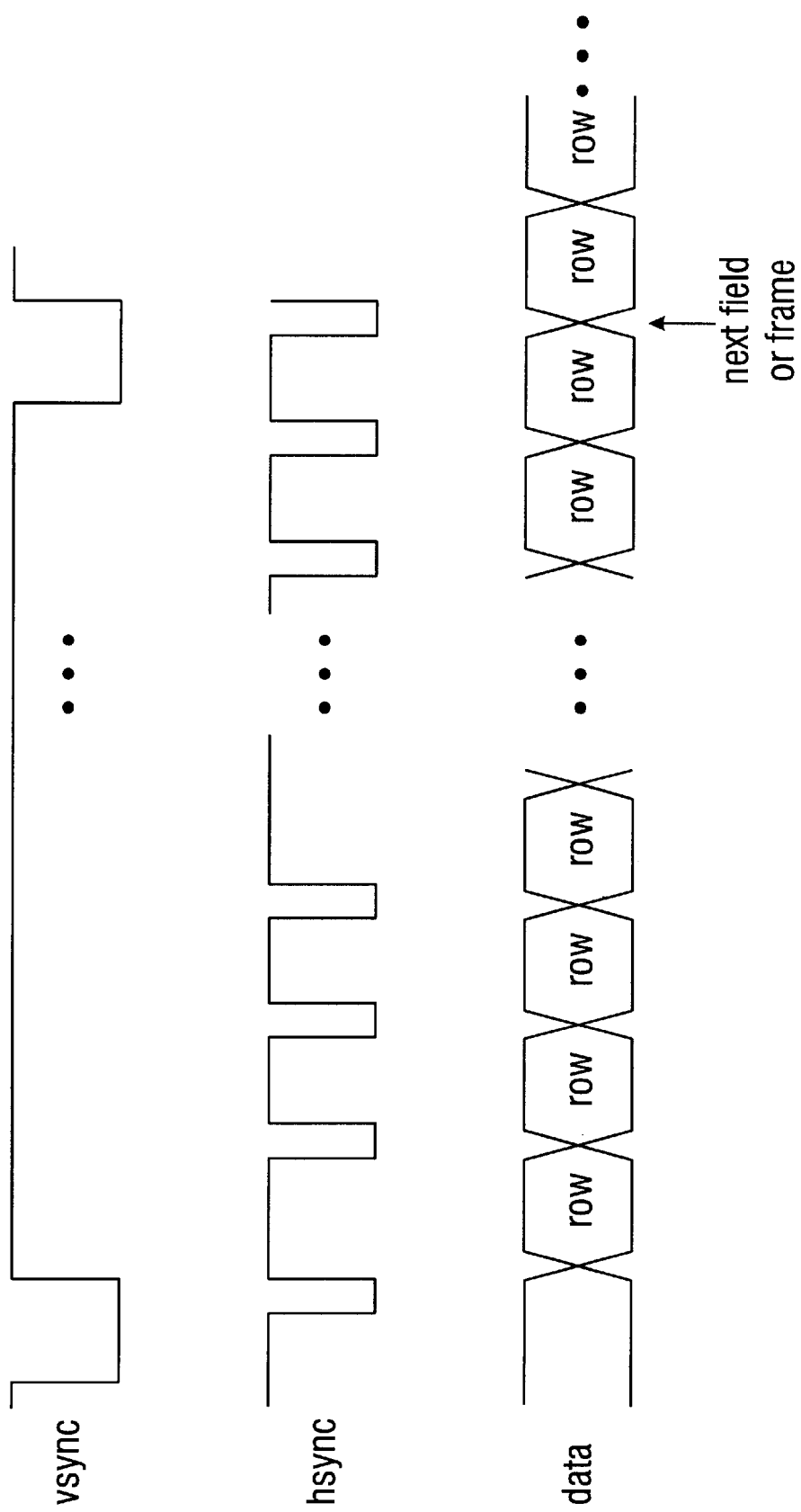
FIG. 3 is a timing diagram of a video signal according to one embodiment of the invention.

FIG. 3 shows typical horizontal and vertical synchronization signals in relation to the data being transmitted in a video or graphics stream. The VSYNC signal indicates the beginning of a frame 70 (or, where appropriate, a field). The HSYNC signal indicates the beginning of a row 74. So, there are many HSYNC signals for every VSYNC signal, as one HSYNC signal occurs for every row 74, while one VSYNC signal occurs for every field or frame 70.

Looking back to FIG. 1, in the system 100, the video data 12 is received into a memory buffer 30. In one embodiment, the memory buffer 30 is used to temporarily store a portion of the video data 12 prior to synchronization with a new graphics signal 40. The horizontal sync signal 14 indicates the start of each row 74 as the video data 12 is being stored in the memory buffer 30.

The memory buffer 30 may be a random access memory (RAM) such as dynamic random access memory (DRAM), synchronous DRAM (SDRAM), static RAM (SRAM), or Rambus® DRAM (RDRAM). In one embodiment, the memory 30 is embedded in other circuitry of the system 100 as on-chip memory. On-chip memory may be preferred over a dedicated memory for designs where board space and cost are considerations, in some embodiments.

The system 100 also includes a graphics conversion unit 32, for receiving the graphics signal 22. Before being mixed together in the system 100, the graphics signal 22 is converted to a format compatible with the video signal 12. In one embodiment, the conversion unit 32 performs color space conversion, overscan scaling and flicker-filtering. The graphics conversion unit 32 produces a new graphics signal 40, to be received by a mixer 38. The new graphics signal 40 has the same resolution as the video signal 12.

In addition to the signal characteristics, the rate of transmission of the new graphics signal 40 is also received. In one embodiment, the system 100 synchronizes the new graphics signal 40 with the video signal 12. Accordingly, in one embodiment, the graphics conversion unit 32 produces a new horizontal sync signal 34 and a new vertical sync signal 36, to be received by the buffer 30. In one embodiment, the new horizontal sync signal 34 looks much like the horizontal sync signal 14 of the video stream 10.

One way to synchronize two video streams traveling at different rates is to buffer an entire frame 70 of the faster stream, then send the frame 70 out when a frame 70 of the slower video stream becomes available. For an 720=480 resolution frame 70, at two bytes/pixel, nearly 700 Kbytes of storage is needed to synchronize the two video streams.

In contrast, in the system 100, the memory buffer 30 stores the video data 12 for only as long as it takes to perform conversion of the graphics data 22. In one embodiment, only a few rows 74 of the video data 12 are stored during this time, before being sent to the mixer 38.

In FIG. 1, the memory buffer 30 includes a row pointer 42, according to one embodiment. The row pointer 42 identifies the start of a row 74 of the video data 12, whether the data is incoming, to be stored in the buffer 30, or outgoing, to be sent to the video mixer 38. The row pointer 42 may thus operate as a counter. In one embodiment, the new horizontal sync signal 34 and the new vertical sync signal 36 adjust the row pointer 42 such that the outgoing video data 12 is synchronized with the new graphics data 40.

In one embodiment, the graphics conversion unit 32 performs conversion operations while the memory buffer 30 stores a small portion of the video data 12. The graphics conversion unit 32 is aware of the characteristics of the video stream 10 entering the system 100. Typically, these characteristics are standardized for display on a television monitor, such as the NTSC color video standard referred to above. Once the conversion operations are complete, the new graphics data 40 is compatible with the video data 12 for mixing. Thus, the graphics conversion unit 32 sends the new horizontal sync signal 34 and the new vertical sync signal 36 to the buffer 30.

Upon receiving the new sync signals, the buffer 30 releases the video data 12 to the mixer 38, which likewise receives the new graphics data 40. In one embodiment, the mixer 38 receives both the video data 12 (starting with the portion that was stored in the buffer 30) and the new graphics data 40 as two independent streams. The two streams include the same number of pixels 72 in each row 74, the same number of pixels 72 in each frame 70, and are sent to the mixer 38 using the same synchronization signals.

The video data 12 and the new graphics data 40 are sent to the mixer 38 using the new horizontal sync signal 34 and the new vertical sync signal 36. The new horizontal and vertical sync signals 34 and 36 are generated by the graphics conversion unit 32, based on the characteristics of the video stream 10. In one embodiment, the video stream 10 is received from a source external to the system 100 and operates according to a well-known protocol or standard.

Accordingly, in one embodiment, the mixer 38 receives the first pixel 72 of the first frame 70 of the video data 12, and, at the same time, receives the first pixel 72 of the first frame 70 of the new graphics data 40. The pixels 72 are mixed, then the next pixel 72 is retrieved and mixed, and so on, until the last pixels 72 of the data streams 12 and 40 are processed. The result is a mixed video data stream 50, as depicted in FIG. 1.

The mixer 38 may receive additional data, such as alpha values (which are typically part of the graphics stream), in deciding how to combine the pixels 72 from each data stream. Following the mixing operation, the mixed digital video data stream 50 may be encoded to an analog signal, then received by a television display.

Although the example describes mixing between the graphics stream 20 and the video stream 10, the system 100 may also synchronize two different graphics signals or two different video signals, as desired. Also, the system 100 may be used with digital or digitized analog video signals operating at a variety of clock rates and resolutions, and may further perform progressive-to-interlaced or interlaced-to-progressive conversion of one of the signals, as needed, before mixing the two signals, according to one embodiment.

For example, in one embodiment, the video stream 10 is interlaced and the graphics stream 20 is progressive. In the graphics conversion unit 32, the graphics signal 22 is converted to an interlaced signal, in addition to scaling and other operations that are performed on the graphics signal 22.

Figure 4:
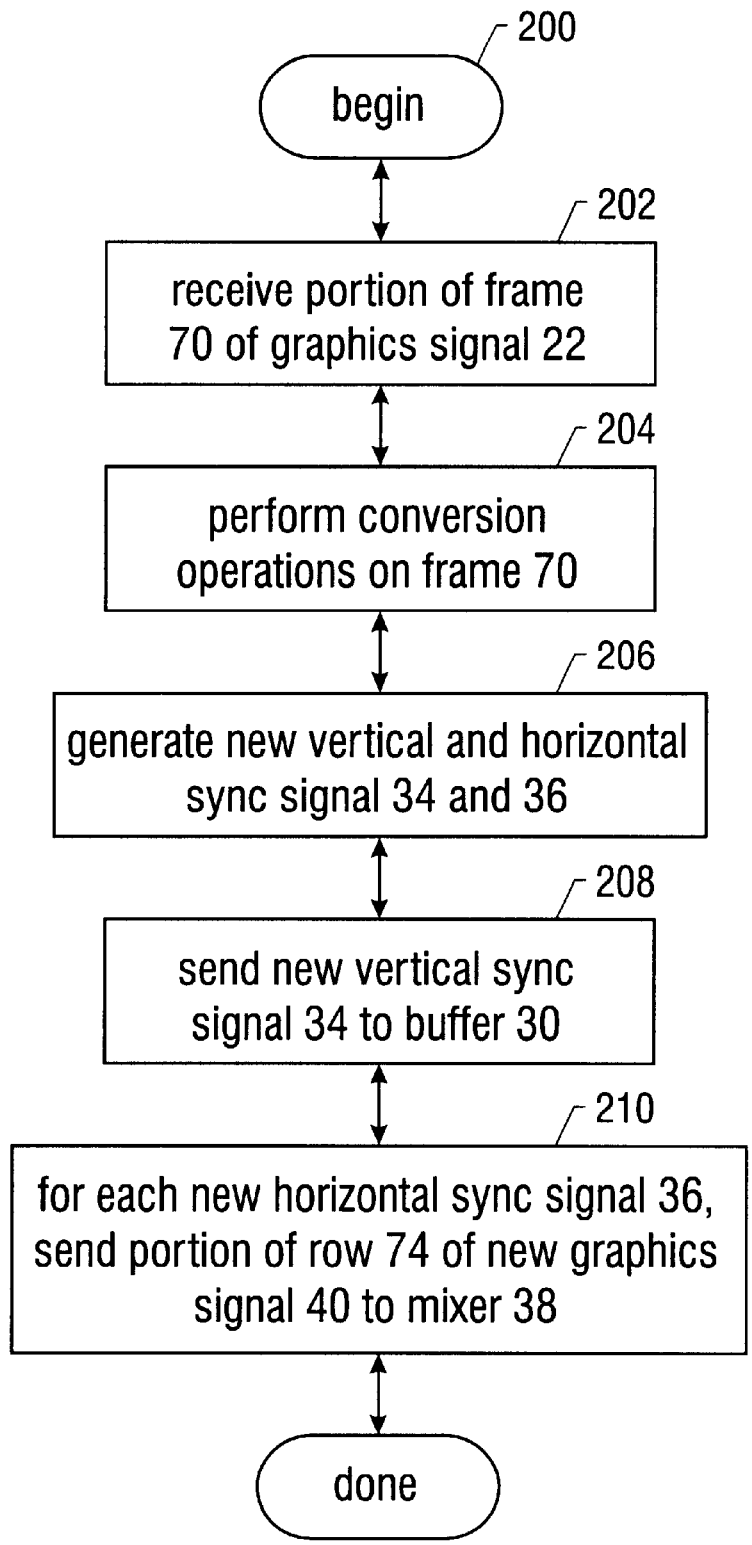
FIG. 4 is a flow diagram illustrating operation of the graphics conversion unit of FIG. 1 according to one embodiment of the invention.

In FIG. 4, a flow diagram illustrates operation of the graphics conversion unit 32 according to one embodiment of the invention. Upon receiving the sync signals, the graphics conversion unit 32 receives a portion of a frame 70 of the graphics signal 22 (block 202). The graphics conversion unit 32 performs conversion operations on the portion of the frame 70 (block 204). Such conversion operations may include color space conversion, overscan scaling, and flicker-filtering.

In one embodiment, the graphics conversion unit 32 knows the characteristics of the incoming video stream 10. Accordingly, a new vertical sync signal 36 and a new horizontal sync signal 34, in accordance with this knowledge, is created by the graphics conversion unit 32 (block 206). Thus, upon completion of the conversion operation, the graphics conversion unit 32 sends a new horizontal sync 34 and a new vertical sync signal 36 to the buffer 30 (block 208).

As described above, in one embodiment, the row pointer 42 of the buffer 30 identifies the start of a row 74 of the video data. The new vertical sync signal 36 identifies the start of a new frame 70 while the new horizontal sync signal 34 identifies the start of a new row 74. Thus, in one embodiment, the new vertical sync signal 36 causes the row pointer 42 to be reset while the new horizontal sync signal 34 causes the row pointer 42 to be incremented.

Figure 5:
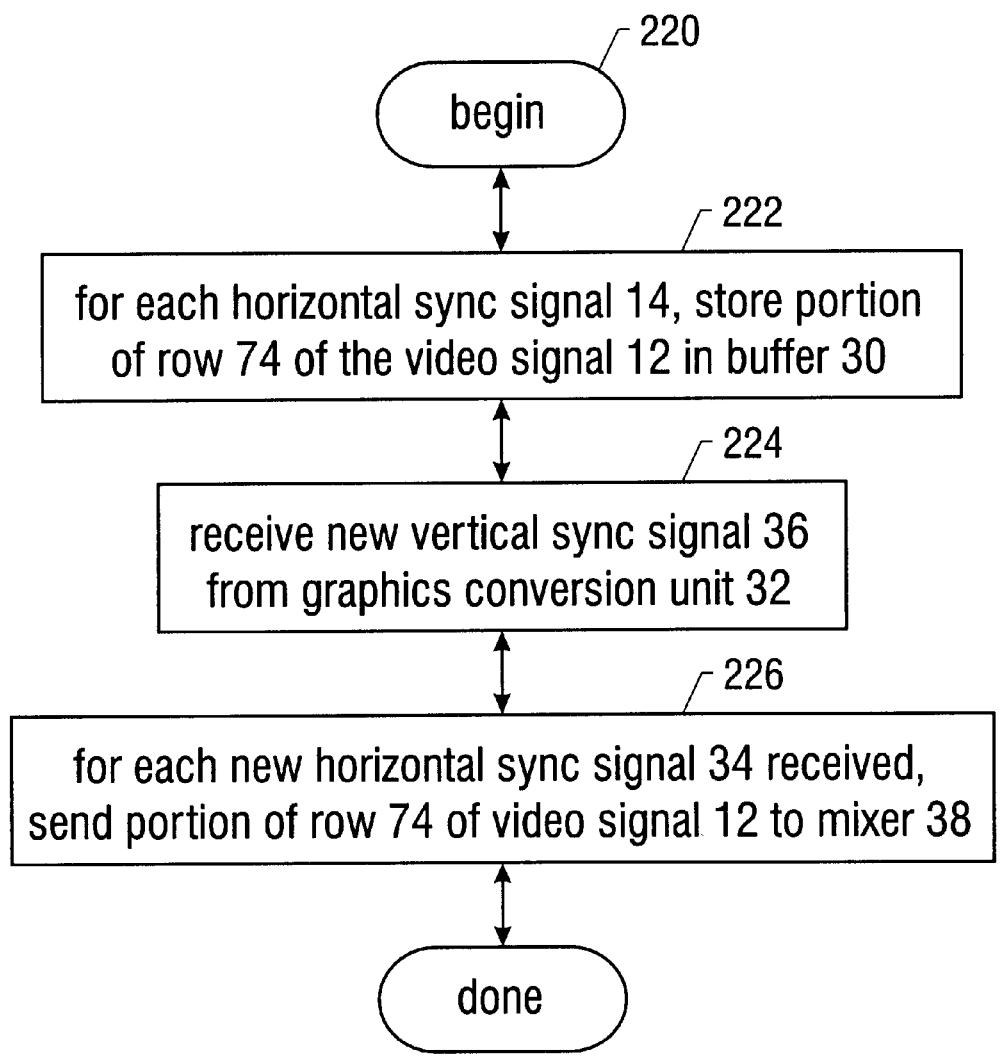
FIG. 5 is a flow diagram illustrating operation of the buffer of FIG. 1 according to one embodiment of the invention.

In one embodiment, data for a new frame 70 is not received into the mixer 38 until the new horizontal sync signal 34 immediately following the new vertical sync signal 36 is received. Accordingly, as shown in FIG. 5 below, upon issuing the new horizontal sync signal 34 to the buffer 30, the buffer 30 begins sending the video data 12 to the mixer 38. For each new horizontal sync signal 34 sent to the buffer 30, a portion of a row 74 of the new graphics signal 40 is sent to the mixer 38 (block 210).

In FIG. 5, the buffer 30 of the system 100, according to one embodiment, receives a portion of a row 74 of the incoming video signal 12, for each horizontal sync signal 14 received (block 222). The buffer 30 receives a new horizontal sync signal 34 and a new vertical sync signal 36 from the graphics conversion unit 32 (block 224), once the graphics conversion operation is complete. At this point, the buffer 30 begins sending the video data 12 to the mixer 38.

The buffer 30 also receives the new horizontal sync signal 34 from the graphics conversion unit 32, once for each row 74 of the new graphics signal 40 that is sent to the mixer 38. Likewise, for each new horizontal sync signal 34 received by the buffer 30, a portion of the row 74 of the video signal 12 is sent to the mixer 38 (block 226). In this manner, the mixer 38 simultaneously receives portions from both the video data 12 and the new graphics data 40.

Figure 6:
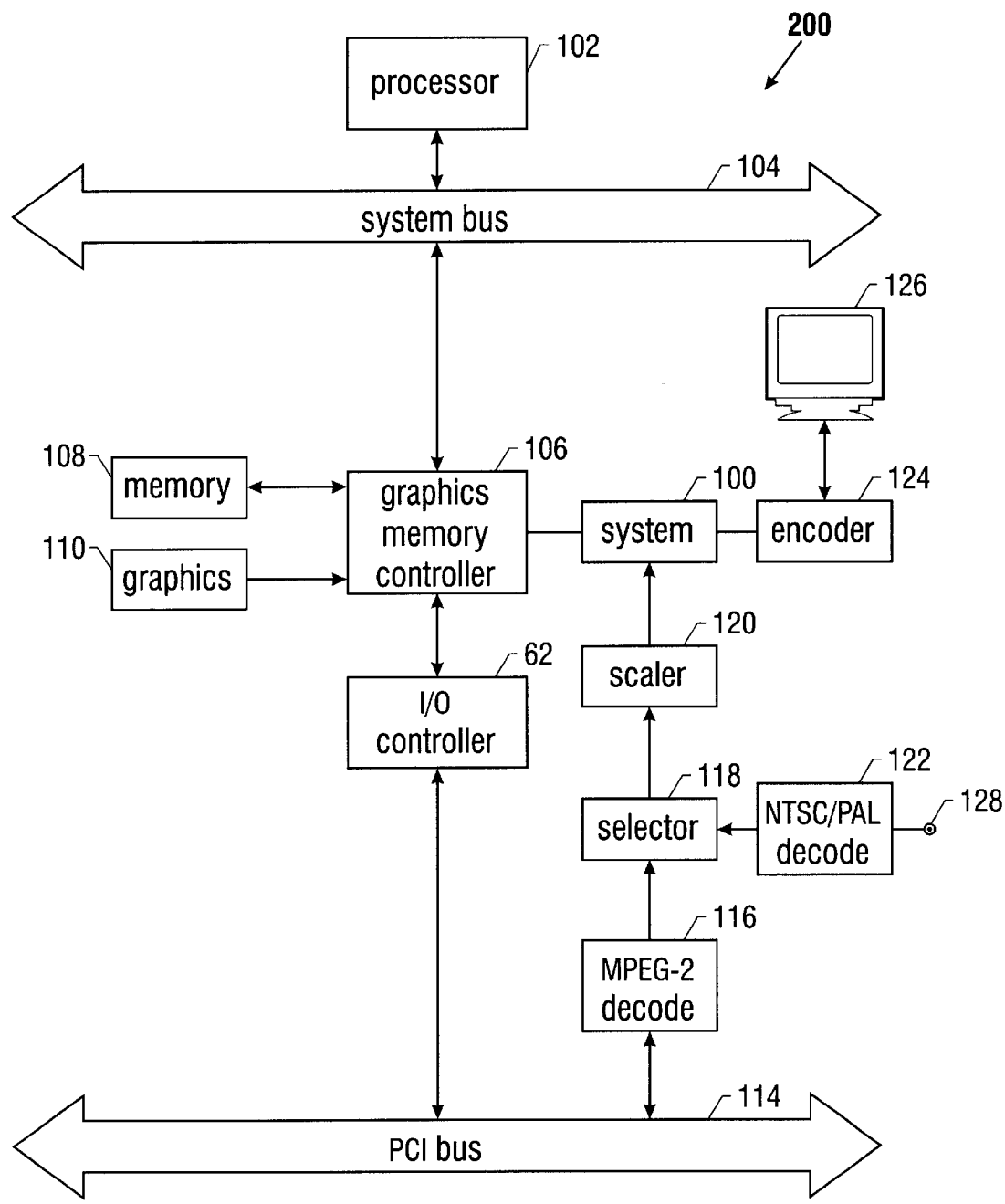
FIG. 6 is a block diagram of the system according to one embodiment of the invention.

In FIG. 6, the system 100 is part of a processor-based system 200, according to one embodiment. The system 200 includes a processor 102 coupled to a graphics memory controller 106 by a host or system bus 104. The graphics memory controller 106 includes both a graphics controller and a memory controller. In other embodiments, the graphics controller may be separated from the memory controller.

The graphics memory controller 106 is coupled to a memory 108, which, in one embodiment, is a random access memory (RAM), such as dynamic RAM (DRAM), synchronous DRAM (SDRAM), static RAM (SRAM), or Rambus® DRAM (RDRAM), to name a few examples.

The graphics memory controller 106 is further coupled to a graphics unit 110, for producing the graphics stream 20 of FIG. 1. The graphics unit 110 may include software for generating the graphics stream 20. Because the graphics stream 20 is produced inside the system 200, the transmission of the stream 20 into the system 100 may be synchronized in real time with the incoming video stream 10. The incoming video stream 10 is less likely to be controllable than the internally generated graphics stream 20.

In one embodiment, the system 100 is coupled to the graphics memory controller 106, for receiving the graphics stream 20. Likewise, an input jack 128, such as for receiving an analog video signal, is coupled to the system 100 through a National Television Systems Committee/Phase Alternate Line, or NTSC/PAL, decoder 122, a selector 118, and a scaler 120. In one embodiment, the video stream 10 is received through the jack 128.

Alternatively, the system 100 may receive a digital video signal from a device coupled to the system 200 by a peripheral component interconnect (PCI) bus 114. The PCI Specification is available from The PCI Special Interest Group, Portland, Oregon 97214. In one embodiment, such a signal may pass through a Moving Pictures Experts Group 2 (MPEG 2) decoder 116, before being received by the selector 118, the scaler 120, and the system 100. The MPEG 2 specification is available from the International Standards Organization as ISO 13818. In one embodiment, the video stream 10 is a digital video signal.

For transmitting the mixed video data stream 50, the system 200 further includes an encoder 124, for converting the mixed digital video data stream 50 to an analog signal suitable for display on an analog television display 126.

The system 200 may be operative in a set-top box environment. Set-top boxes are processor-based systems which connect to an analog television display. They often support personal computer-based software, such as email programs, web browser software, such as for Internet access, and television broadcasts, such as cable programming. The ability to perform the above mixing operations without the use of an expensive frame buffer, as in the system 100, may appeal to the set-top box market.

Thus, according to the embodiments described herein, two independent data streams may be synchronized in real-time. In one embodiment, one data stream may be converted to look like the other data stream prior to mixing the two data streams together. One data stream is buffered while the other data stream is converted, according to one embodiment. A memory buffer is used to synchronize the two data streams. In one embodiment, substantially less than a frame of video data is buffered before being mixed with the other video data stream.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving a video stream by a memory buffer;

receiving a graphics stream by a conversion unit; and sending the video stream from the memory buffer when the memory buffer receives a new horizontal sync signal from the conversion unit.

2. The method of claim 1, further comprising:

resetting a row pointer in the memory buffer upon receiving a new vertical sync signal.

3. The method of claim 2, further comprising:

incrementing the row pointer in the memory buffer upon receiving the new horizontal sync signal.

4. The method of claim 1, further comprising:

receiving a vertical sync signal from the graphics stream by the conversion unit;

producing the new vertical sync signal; and sending the new vertical sync signal to the memory buffer.

5. The method of claim 4, further comprising:

receiving a horizontal sync signal from the graphics stream by the conversion unit; and producing the new horizontal sync signal.

6. The method of claim 1, further comprising:

converting the graphics stream to a new graphics stream; and combining the new graphics stream with the video stream.

7. A system comprising:

a memory buffer for receiving a video stream, wherein the memory buffer:

receives a horizontal sync signal from the video stream;

stores video data from the video stream; and transmits the video data upon receiving a new horizontal sync signal; and a graphics conversion unit for receiving a graphics stream, wherein the graphics conversion unit:

converts the graphics stream to a new graphics stream; and sends the new horizontal sync signal to the memory buffer.

8. The system of claim 7, wherein the graphics conversion unit further sends a vertical sync signal to the memory buffer.

9. The system of claim 8, wherein memory buffer further comprises a row pointer wherein:

the row pointer is reset upon receiving the vertical sync signal; and the row pointer is incremented upon receiving the new horizontal sync signal.

10. The system of claim 7, further comprising a mixer for receiving the new graphics stream and the video data.

11. The system of claim 7, wherein the memory is an on-chip memory device.

12. The system of claim 7, wherein the video data comprises a plurality of frames and a frame comprises a predetermined amount of bytes.

13. The system of claim 12, wherein the memory comprises a number of bytes and the number is smaller than the predetermined amount.

14. An article comprising a medium storing software that enables a processor-based system to:

receive a video stream by a memory buffer;

receive a graphics stream by a conversion unit; and send the video stream from the memory buffer when the memory buffer receives a new horizontal sync signal from the conversion unit.

15. The article of claim 14, further storing software that enables a processor-based system to:

reset a row pointer in the memory buffer upon receiving a new vertical sync signal.

16. The article of claim 15, further storing software that enables a processor-based system to:

increment the row pointer in the memory buffer upon receiving the new horizontal sync signal.

17. The article of claim 15, further storing software that enables a processor-based system to:

receive a vertical sync signal from the graphics stream by the conversion unit;

produce the new vertical sync signal; and send the new vertical sync signal to the memory buffer.

18. The article of claim 14, further storing software that enables a processor-based system to:

receive a horizontal sync signal from the graphics stream by the conversion unit; and produce the new horizontal sync signal.

19. The article of claim 18, further storing software that enables a processor-based system to:

convert the graphics stream to a new graphics stream; and combine the new graphics stream with the video stream.

\* \* \* \* \*